US012204276B2

(12) United States Patent
Tatekawa et al.

(10) Patent No.: US 12,204,276 B2
(45) Date of Patent: Jan. 21, 2025

(54) PREPARING METHOD OF ELECTROSTATIC CHARGE IMAGE DEVELOPING TONER, ELECTROSTATIC CHARGE IMAGE DEVELOPING TONER, AND ELECTOSTATIC CHARGE IMAGE DEVELOPER

(71) Applicant: FUJIFILM Business Innovation Corp., Tokyo (JP)

(72) Inventors: Takahisa Tatekawa, Kanagawa (JP); Daisuke Tomita, Kanagawa (JP); Daisuke Noguchi, Kanagawa (JP); Kazuhiko Nakamura, Kanagawa (JP); Yuji Isshiki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 121 days.

(21) Appl. No.: 17/406,271

(22) Filed: Aug. 19, 2021

(65) Prior Publication Data

US 2022/0299897 A1 Sep. 22, 2022

(30) Foreign Application Priority Data

Mar. 19, 2021 (JP) ................................ 2021-046471

(51) Int. Cl.
*G03G 9/08* (2006.01)

(52) U.S. Cl.
CPC ................................ *G03G 9/0804* (2013.01)

(58) Field of Classification Search
None
See application file for complete search history.

(56) References Cited

U.S. PATENT DOCUMENTS 6,296,980 B1 * 10/2001 Oshiba ................ G03G 9/0819 430/110.3
2004/0197693 A1 * 10/2004 Ninomiya ............. G03G 9/097 430/108.7

FOREIGN PATENT DOCUMENTS

JP 2019008042 A * 1/2019
JP 2019028158 A * 2/2019
JP 2019-111462 A 7/2019

OTHER PUBLICATIONS

JP-2019008042-A Translation (Year: 2023).*
JP-2019028158-A Translation (Year: 2023).*

* cited by examiner

*Primary Examiner* — Peter L Vajda
*Assistant Examiner* — Charles Collins Sullivan, IV
(74) *Attorney, Agent, or Firm* — Sughrue Mion, PLLC

(57) ABSTRACT

A preparing method of an electrostatic charge image developing toner includes: aggregating binder resin particles in a dispersion containing the binder resin particles to form aggregated particles; and coalescing the aggregated particles by heating a dispersion containing the aggregated particles to form toner particles. The aggregating includes stirring the dispersion in the aggregating at a required stirring power of 1.0 kW/m$^3$ or more and 6.0 kW/m$^3$ or less per unit volume, and the preparing method satisfies the following Requirement (1), in which Requirement (1): a viscosity of the dispersion during the stirring is 5 Pa·s or more and 50 Pa·s or less at a shear rate of 1/s, where the viscosity of the dispersion is measured at a sample temperature of 25° C. using a part of the dispersion as a sample.

15 Claims, 1 Drawing Sheet

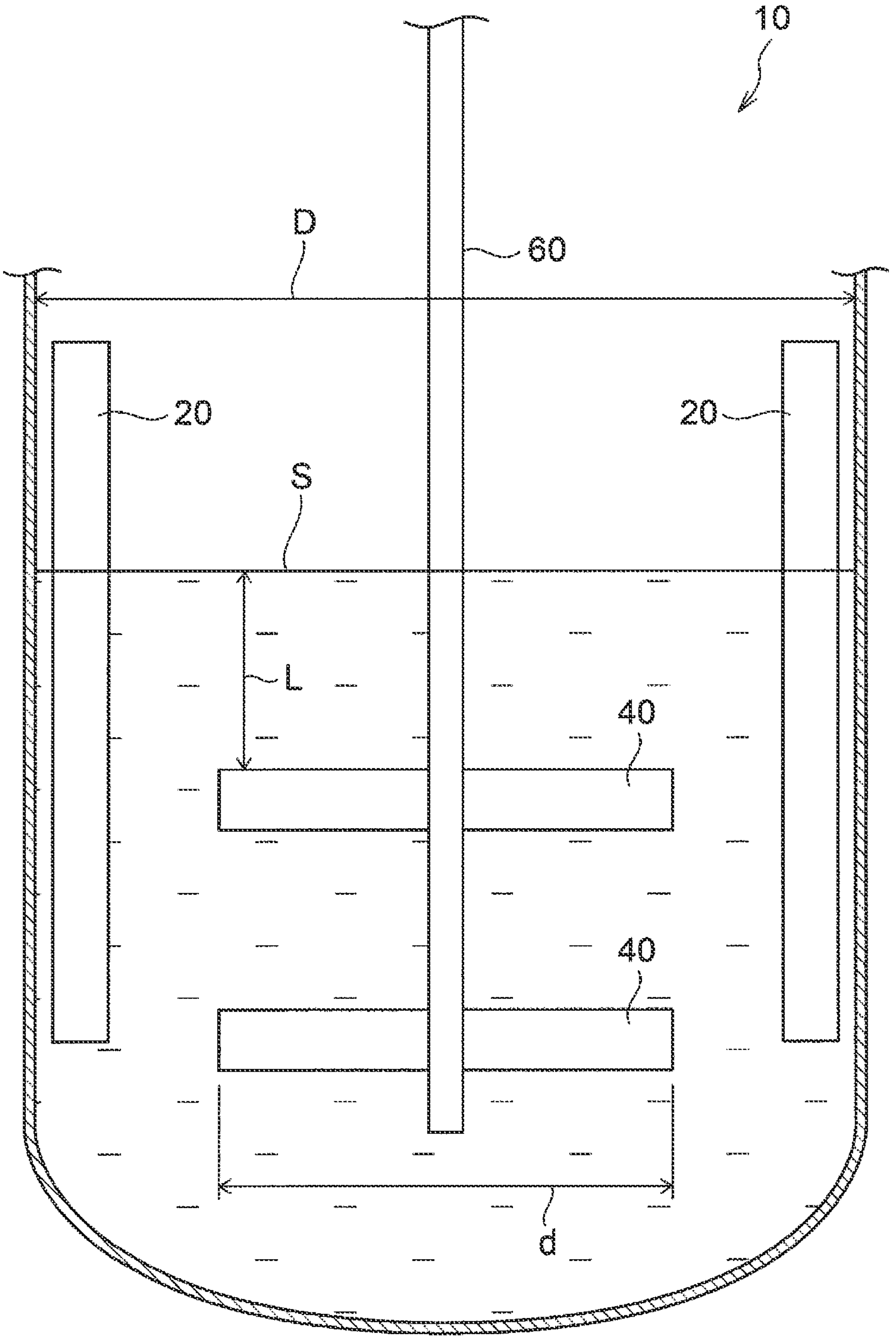
10
D
60
20
20
S
L
40
40
d

PREPARING METHOD OF ELECTROSTATIC CHARGE IMAGE DEVELOPING TONER, ELECTROSTATIC CHARGE IMAGE DEVELOPING TONER, AND ELECTOSTATIC CHARGE IMAGE DEVELOPER

CROSS-REFERENCE TO RELATED APPLICATIONS

This application is based on and claims priority under 35 USC 119 from Japanese Patent Application No. 2021-046471 filed on Mar. 19, 2021.

BACKGROUND

(i) Technical Field

The present disclosure relates to a preparing method of an electrostatic charge image developing toner, an electrostatic charge image developing toner, and electrostatic charge image developer.

(ii) Related Art

JP2019-008042A discloses a preparing method of a toner, the method in which in an aggregating step of stirring an aggregation liquid having a viscosity at a shear rate of 10 $s^{-1}$ of 1 Pa·s or more and having a thixotropy index of 7 or more, the aggregation liquid is stirred with stirring blades of plural shafts, a portion having a shear rate of 10 $s^{-1}$ or less is 50% by volume or less, and a portion having a shear rate of 400 $s^{-1}$ or more is 1% by volume or less.

JP2019-111462A discloses a preparing method of aggregated particles, the method including a step of mixing and stirring an aqueous dispersion of resin particles and an aggregating agent to aggregate and grow the aggregated particles until a volume median particle diameter reaches a target value, and a step of increasing a stirring power per unit weight when the volume median particle diameter of the aggregated particles which are aggregated and grown reaches a target value.

SUMMARY

Aspects of non-limiting embodiments of the present disclosure relate to a preparing method of an electrostatic charge image developing toner, the method reducing mixing of a coarse toner, compared to a case of stirring a dispersion in an aggregating step at a required stirring power of less than 1.0 $kW/m^3$ and more than 6.0 $kW/m^3$ per unit volume or a case where a viscosity of the dispersion during stirring is less than 5 Pa·s and more than 50 Pa·s at a shear rate of 1/s (here, the viscosity of the dispersion is measured at a sample temperature of 25° C. using a part of the dispersion as a sample).

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a preparing method of an electrostatic charge image developing toner, the method including:

aggregating binder resin particles in a dispersion containing the binder resin particles to form aggregated particles; and coalescing the aggregated particles by heating a dispersion containing the aggregated particles to form toner particles, in which the aggregating includes stirring the dispersion in the aggregating at a required stirring power of 1.0 $kW/m^3$ or more and 6.0 $kW/m^3$ or less per unit volume, and the preparing method satisfies the following Requirement (1).

Requirement (1): a viscosity of the dispersion during the stirring is 5 Pa·s or more and 50 Pa·s or less at a shear rate of 1/s.

where the viscosity of the dispersion is measured at a sample temperature of 25° C. using a part of the dispersion as a sample.

BRIEF DESCRIPTION OF THE DRAWINGS

Exemplary embodiments of the present disclosure will be described in detail based on the following figures, wherein:

The FIGURE illustrates a schematic configuration diagram showing an exemplary embodiment of a stirring tank used in an aggregating step in a preparing method of a toner according to the present exemplary embodiment.

DETAILED DESCRIPTION

Hereinafter, exemplary embodiments of the present disclosure will be described. These descriptions and examples illustrate exemplary embodiments and do not limit the scope of the exemplary embodiments.

The numerical range indicated by using "to" in the present disclosure indicates a range including the numerical values before and after "to" as the minimum value and the maximum value, respectively.

In a numerical range described in steps in the present disclosure, an upper limit or a lower limit described in one numerical range may be replaced with an upper limit or a lower limit of another numerical range described in steps. Further, in the numerical range described in the present disclosure, the upper limit or the lower limit on the numerical range may be replaced with the value described in examples.

In the present disclosure, the term "step" includes not only an independent step but also other steps as long as the intended purpose of the step is achieved even if it is not able to be clearly distinguished from other steps.

In the present disclosure, each component may contain plural kinds of applicable substances. When referring to the amount of each component in a composition in the present disclosure, in a case where there are plural kinds of substances corresponding to each component in the composition, the amount of each component in the composition means a total amount of the plural kinds of substances present in the composition, unless otherwise specified.

In the present disclosure, plural kinds of particles corresponding to each component may be contained. In a case where there are plural kinds of particles corresponding, to each component in a composition, a particle diameter of each component means a value in a mixture of the plural kinds of particles present in the composition, unless otherwise specified.

In the present disclosure, "(meth)acrylic" means at least one of acrylic or methacrylic, and "(meth)acrylate" means at least one of acrylate or methacrylate.

In the present disclosure, a "toner" refers to an "electrostatic charge image developing toner", a "developer" refers to an "electrostatic charge image developer", and a "carrier" refers to a "electrostatic charge image carrier".

In the present disclosure, a method for preparing a toner particle by aggregating and coalescing material particles in a solvent is referred to as an emulsion aggregation (EA) method.

<Preparing Method of Electrostatic Charge Image Developing Toner>

The preparing method of a toner according to the exemplary embodiment is a preparing method of a toner including preparing toner particles by the EA method, and has the following aggregating step and coalescing step.

Aggregating step: A step of aggregating binder resin particles in a dispersion containing the binder resin particles to form aggregated particles. Coalescing step: A step of coalescing the aggregated particles by heating a dispersion containing the aggregated particles to form toner particles.

In the preparing method of a toner according to the present exemplary embodiment, the aggregating step includes stirring the dispersion in the aggregating step at a required stirring power of 1.0 kW/m$^3$ or more and 6.0 kW m$^3$ or less per unit volume. The required stirring power per unit volume may be constant or may vary as long as the power is within the above range.

When the required stirring power per unit volume is less than 1.0 kW/m$^3$, uniformity of stirring of the dispersion tends to deteriorate, and aggregated particles having a large particle diameter tend to be formed. As a result, a coarse toner may be mixed into a finished toner, and dot-shaped color unevenness may occur in an image. From the viewpoint, the required stirring power per unit volume may be 1.0 kW/m$^3$ or more, preferably 1.5 kW/m$^3$ or more, and more preferably 2.0 kW/m$^3$ or more.

When the required stirring power per unit volume is more than 6.0 kW/m$^3$, which means high viscosity of the dispersion, aggregated particles having a large particle diameter tend to be formed. As a result, a coarse toner may be mixed into a finished toner, and dot-shaped color unevenness may occur in an image. From the viewpoint, the required stirring power per unit volume may be 6.0 kW/m$^3$ or less, preferably 5.5 kW/m$^3$ or less, and more preferably 5.0 kW/m$^3$ or less.

The required stirring power (kW/m$^3$) per unit volume is controlled by varying a rotation speed of a stirring unit, according to the viscosity of the dispersion and a dimension of the stirring unit.

In the preparing method of a toner according to the exemplary embodiment, in the aggregating step, dispersion during stirring at a required stirring power of 1.0 kW/m$^3$ or more and 6.0 kW/m$^3$ or less per unit volume satisfies the following Requirement (1).

Requirement (1): A viscosity of the dispersion during stirring is 5 Pa·s or more and 50 Pa·s or less at a shear rate of 1/s. Here, the viscosity of the dispersion is measured at a sample temperature of 25° C. using a part of the dispersion as a sample.

The viscosity of the dispersion during stirring may be constant or may vary as long as the viscosity is within the above range.

When the viscosity of the dispersion is less than 5 Pa·s at a shear rate of 1/s, a particle size distribution of the aggregated particles tends to be wide, and the aggregated particles having a large particle diameter tend to be mixed. As a result, a coarse toner may be mixed into a finished toner, and dot-shaped color unevenness may occur in an image. From the viewpoint, the viscosity of the dispersion may be 5 Pa·s or more, preferably 10 Pa·s or more, more preferably 15 Pa·s or more, and still further preferably 20 Pa·s or more at a shear rate of 1/s.

When the viscosity of the dispersion is more than 50 Pa·s at a shear rate of 1/s, the viscosity of the dispersion is high and the particle diameter of the aggregated particles tends to be large. As a result, a coarse toner may be mixed into a finished toner, and dot-shaped color unevenness may occur in an image. From the viewpoint, the viscosity of the dispersion may be 50 Pa·s or less, preferably 45 Pa·s or less, more preferably 40 Pa·s or less, and still further preferably 35 Pa·s or less at a shear rate of 1/s.

In the preparing method of a toner according to the exemplary embodiment, in the aggregating step, dispersion during stirring at a required stirring power of 1.0 kW/m$^3$ or more and 6.0 kW/m$^3$ or less per unit volume may further satisfy the following Requirement (2), from the viewpoints of reducing mixing the coarse toner and preventing the dot-shaped color unevenness from occurring in an image.

Requirement (2): The viscosity of the dispersion during the stirring is 0.1 Pa·s or more and 2.0 Pa·s or less at a shear rate of 20/s. Here, the viscosity of the dispersion is measured at a sample temperature of 25° C. using a part of the dispersion as a sample.

The viscosity of the dispersion during stirring may be constant or may vary as long as the viscosity is within the above range.

When the viscosity of the dispersion is 0.1 Pa·s or more at a shear rate of 20/s, the particle size distribution of the aggregated particles becomes relatively narrow, and aggregated particles having large particle diameters are less likely to be mixed. As a result, coarse toner is less likely to be mixed into the finished toner, and dot-shaped color unevenness is less likely to occur in an image. From the viewpoints, the viscosity of the dispersion may be 0.3 Pa·s or more, and preferably 0.5 Pa·s or more at a shear rate of 20/s.

When the viscosity of the dispersion is 2.0 Pa·s or less at a shear rate of 20/s, the viscosity of the dispersion is not too high and the particle diameter of the aggregated particles may be suppressed. As a result, coarse toner is less likely to be mixed into the finished toner, and dot-shaped color unevenness is less likely to occur in an image. From the viewpoints, the viscosity of the dispersion may be 1.8 Pa·s or less, and preferably 1.5 Pa·s or less at a shear rate of 20/s.

Requirements (1) and (2) may be controlled by the particle diameter of material particles contained in the dispersion, the amount of the surfactant contained in the dispersion, a temperature of the dispersion during aggregating, a kind of the aggregating agent, and the like.

The smaller the particle diameter of the material particles, the higher the viscosity at a shear rate of 1/s and the viscosity at a shear rate of 20/s.

The larger the amount of the surfactant, the lower the viscosity at a shear rate of 1/s and the viscosity at a shear rate of 20/s.

In the exemplary embodiment, the viscosity of the dispersion is measured at a sample temperature of 25° C. using a part of the dispersion as a sample. The details of the method of measuring the viscosity of the dispersion are as follows.

A rotary viscometer is used. An example of the rotary viscometer is an R/S plus rheometer (spindle: CP-75-1) manufactured by Brookfield. The rotary viscometer is installed in an environment at a temperature of 25° C. and a relative humidity of 55%. During the stirring, the sample to be measured is collected multiple times, and the viscosity of the dispersion during the stirring is confirmed.

—Viscosity at Shear Rate of 1/s—

3 g of the dispersion adjusted to a temperature of 25° C. is used as a sample. The shear rate ($s^{-1}$) is increased in 0.2 increments per each second and then decreased at the shear rate of 0.5/s or more and 12/s or less, and a shear stress (Pa) is measured every 2 seconds. The common logarithm of the shear rate ($s^{-1}$) is taken on a horizontal axis, and the common logarithm of the viscosity (Pa·s) obtained from a shear stress (Pa) and the shear rate ($s^{-1}$) is taken on a vertical axis. The viscosity is plotted with respect to a shear rate and respective straight lines for increasing and decreasing are drawn. In each of the straight lines for the increasing and decreasing, the viscosity (Pa·s) at 1/s is obtained from the common logarithm value (intercept of the straight line) of the viscosity at 1/s (common logarithm of shear rate=0), and an average value of two viscosities is obtained. The measurement is performed three times, and the average value is further obtained and used as the viscosity (Pa·s) at the shear rate of 1/s.

—Viscosity at Shear Rate of 20/s—

3 g of the dispersion adjusted to a temperature of 25° C. is used as a sample. The shear rate ($s^{-1}$) is increased in 2.0 increments per each second and then decreased at the shear rate of 0.5/s or more and 200/s or less, and a shear stress (Pa) is measured every 3 seconds. The common logarithm of the shear rate ($s^{-1}$) is taken on a horizontal axis, and the common logarithm of the viscosity (Pa·s) obtained from a shear stress (Pa) and the shear rate ($s^{-1}$) is taken on a vertical axis. The viscosity is plotted with respect to a shear rate and respective straight lines for increasing and decreasing are drawn. In each of the straight lines for the increasing and decreasing, the viscosity (Pa·s) at 20/s is obtained from the common logarithm value (a common logarithm value of viscosity obtained from an intersection of straight line and the common logarithm of shear rate=1.30) at 20/s (common logarithm of shear rate=1.30), and an average value of two viscosities is obtained. The measurement is performed three times, and the average value is further obtained and used as the viscosity (Pa·s) at the shear rate of 20/s.

Hereinafter, steps and materials of the preparing method of a toner according to the exemplary embodiment will be described in detail.

[Aggregating Step (First Aggregating Step)]

Aggregating step is a step of aggregating at least binder resin particles in a dispersion containing at least the binder resin particles to form aggregated particles.

The dispersion to be used in the aggregating step may further contain at least one of the release agent particles or the coloring agent particles. Therefore, the aggregating step may be a step of further aggregating at least one of the release agent particles or the coloring agent particles together with the binder resin particles.

In a case where the preparing method of a toner according to the exemplary embodiment includes a second aggregating step (step of forming a shell layer) to be described later, the above aggregating step is referred to as a “first aggregating step”. The first aggregating step is a step of forming a core in a toner having a core-shell structure.

For example, a resin particle dispersion containing hinder resin particles, a release agent particle dispersion containing release agent particles, and a coloring agent particle dispersion containing coloring agent particles are prepared respectively, and these particle dispersions are mixed to prepare the dispersion to be used in the aggregating step. The order of mixing these particle dispersions is not limited.

Hereinafter, what is common to the resin particle dispersion, the release agent particle dispersion, and the coloring agent particle dispersion will be collectively referred to as a “particle dispersion”.

An example of the exemplary embodiment of the particle dispersion is a dispersion in which a material is dispersed in a dispersion medium in the form of particles by a surfactant.

The dispersion medium of the particle dispersion may be an aqueous medium. Examples of the aqueous medium include water and alcohol. The water is preferably water having a reduced ion content such as distilled water and ion exchanged water. These aqueous media may be used alone, or two or more thereof may be used in combination.

The surfactant that disperses the material in a dispersion medium may be any of an anionic surfactant, a cationic surfactant, and a nonionic surfactant. Examples thereof include: anionic surfactants such as sulfate ester salt, sulfonate, phosphoric acid ester, and soap anionic surfactants; cationic surfactants such as amine salt and quaternary ammonium salt cationic surfactants; nonionic surfactants such as polyethylene glycol, alkyl phenol ethylene oxide adduct, and polyhydric alcohol nonionic surfactants; and the like. The surfactants may be used alone, or two or more thereof may be used in combination. Nonionic surfactants may be used in combination with anionic surfactants or cationic surfactants.

Examples of a method of dispersing the material in the dispersion medium in the form of particles include a common dispersing method using a rotary shearing-type homogenizer, or a ball mill, a sand mill, or a Dyno mill as media.

Examples of the method of dispersing the resin in the dispersion medium in the form of particles include a phase inversion emulsification method. The phase inversion emulsification method includes: dissolving a resin in a hydrophobic organic solvent in which the resin is soluble; conducting neutralization by adding a base to an organic continuous phase (O phase); and performing phase inversion from W/O to O/W by adding an aqueous medium (W phase), thereby dispersing the resin as particles in the aqueous medium.

A volume average particle diameter of the particles dispersed in the particle dispersion may be 30 nm or more and 300 nm or less, preferably 50 nm or more and 250 nm or less, and more preferably 80 nm or more and 200 nm or less.

The volume average particle diameter of the particles in the particle dispersion refers to a particle diameter when the cumulative percentage becomes 50% from the small diameter side in a particle size distribution measured by a laser diffraction-type particle size distribution measuring device (for example, manufactured by Horiba, Ltd., LA-700).

The content of the particles contained in the particle dispersion may be, for example, 5% by weight or more and 50% by weight or less, preferably 10% by weight or more and 40% by weight or less, and more preferably 15% by weight or more and 30% by weight or less.

—Binder Resin—

Examples of the binder resin include a homopolymer of monomer such as styrenes (for example, styrene, parachlorostyrene, and α-methylstyrene), (meth)acrylates (for example, methyl acrylate, ethyl acrylate, n-propyl acrylate, n-butyl acrylate, lauryl acrylate, 2-ethyl hexyl acrylate, methyl methacrylate, ethyl methacrylate, n-propyl methacrylate, lauryl methacrylate, and 2-ethyl hexyl methacrylate), ethylenically unsaturated nitriles (for example, acrylonitrile and methacrylonitrile), vinyl ethers (for example, vinyl methyl ether, and vinyl isobutyl ether), vinyl ketones (for example, vinyl methyl ketone, vinyl ethyl ketone, and vinyl isopropenyl ketone), olefins (for example, ethylene, propylene, and butadiene), or a vinyl-based resin composed of a copolymer obtained by combining two or more of these monomers.

Examples of the binder resin also include a non-vinyl resin such as an epoxy resin, a polyester resin, a polyurethane resin, a polyamide resin, a cellulose resin, a polyether resin, and a modified rosin, a mixture of these resins and the vinyl-based resin, or a graft polymer obtained by polymerizing a vinyl monomer in the coexistence.

These binder resins may be used alone, or two or more thereof may be used in combination.

The binder resin may be a polyester resin. Examples of the polyester resin include an amorphous polyester resin and a crystalline polyester resin.

In the exemplary embodiment, "crystalline" of the polyester resin means that a resin has a clear endothermic peak instead of a stepwise endothermic change in differential scanning calorimetry (DSC), and specifically, a half width of an endothermic peak when measured at a heating rate of 10° C./min is within 10° C.

In the exemplary embodiment, the "amorphous" of the polyester resin means that the half width exceeds 10° C., a stepwise endothermic change is shown, or a clear endothermic peak is not recognized.

—Amorphous Polyester Resin—

Note that, as the amorphous polyester resin, a commercially available product may be used, or a synthetic product may be used.

Examples of the amorphous polyester resin include a condensation polymer of polyvalent carboxylic acid and polyhydric alcohol.

Examples of the polyvalent carboxylic acid which is a polymerization component of the amorphous polyester resin include aliphatic dicarboxylic acids (for example, oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (for example, cyclohexanedicarboxylic acid), aromatic dicarboxylic acids (for example, terephthalic acid, isophthalic acid, phthalic acid, and naphthalenedicarboxylic acid), anhydrides thereof, or lower (for example, 1 to 5 carbon atoms) alkyl esters thereof. Among these, as the polyvalent carboxylic acid, for example, aromatic dicarboxylic acid is preferable.

The polyvalent carboxylic acid may be used in combination with dicarboxylic acid and trivalent or higher carboxylic acid having a crosslinked structure or a branched structure. Examples of the trivalent or higher carboxylic acid include trimellitic acid, pyromellitic acid, anhydrides thereof, and lower (for example, 1 to 5 carbon atoms) alkyl esters thereof.

These polyvalent carboxylic acids may be used alone, or two or more thereof may be used in combination.

Examples of polyhydric alcohols which is the polymerization component of the amorphous polyester resin include aliphatic diols (for example, ethylene glycol, diethylene glycol, triethylene glycol, propylene glycol, butanediol, hexanediol, and neopentyl glycol), alicyclic diols (for example, cyclohexanediol, cyclohexanedimethanol, and hydrogenated bisphenol A), and aromatic diols (for example, a bisphenol A ethylene oxide adduct and a bisphenol A propylene oxide adduct). Among these, as the polyhydric alcohol, for example, aromatic diols and alicyclic diols are preferable, and aromatic diols are more preferable.

As the polyhydric alcohol which is the polymerization component of the amorphous polyester resin, tri- or higher polyhydric alcohol having a crosslinked structure or a branched structure may be used together with the diol. Examples of the tri- or higher polyhydric alcohol include glycerin, trimethylolpropane, and pentaerythritol.

These polyhydric alcohols may be used alone, or two or more thereof may be used in combination.

A glass transition temperature (Tg) of the amorphous polyester resin may be 50° C. or higher and 80° C. or lower, and preferably 50° C. or higher and 65° C. or lower.

The glass transition temperature is obtained from a DSC curve obtained by differential scanning calorimetry (DSC). More specifically, the glass transition temperature is obtained from "extrapolated glass transition onset temperature" described in the method of obtaining a glass transition temperature in JIS K 7121-1987 "testing methods for transition temperatures of plastics".

A weight average molecular weight (Mw) of the amorphous polyester resin may be 5,000 or more and 1,000,000 or less, and preferably 7,000 or more and 500,000 or less.

The number average molecular weight (Mn) of the amorphous polyester resin may be 2,000 or more and 100,000 or less.

The molecular weight distribution Mw/Mn of the amorphous polyester resin may be 1.5 or more and 100 or less, and is more preferably 2 or more and 60 or less.

The weight average molecular weight and the number average molecular weight are measured by gel permeation chromatography (GPC). The molecular weight measurement by GPC is performed using GPC•HLC-8120 GPC, manufactured by Tosoh Corporation as a measuring device, Column•TSK gel Super HM-M (15 cm), manufactured by Tosoh Corporation, and a THF solvent. The weight average molecular weight and the number average molecular weight are calculated by using a molecular weight calibration curve plotted from a monodisperse polystyrene standard sample from the results of the foregoing measurement.

A known preparing method is used to prepare the amorphous polyester resin. Specific examples thereof include a method of conducting a reaction at a polymerization temperature set to be 180° C. of higher and 230° C. or lower, if necessary, under reduced pressure in the reaction system, while removing water or an alcohol generated during condensation.

When monomers of the raw materials are not dissolved or compatibilized under a reaction temperature, a high-boiling-point solvent may be added as a solubilizing agent to dissolve the monomers. In this case, a polycondensation reaction is conducted while distilling away the solubilizing agent. When a monomer having poor compatibility is present in a copolymerization reaction, the monomer having poor compatibility and an acid or an alcohol to be polycondensed with the monomer may be previously condensed and then polycondensed with the major component.

—Crystalline Polyester Resin—

Note that, as the crystalline polyester resin, a commercially available product may be used, or a synthetic product may be used.

Examples of the crystalline polyester resin include a polycondensate of polyvalent carboxylic acid and polyhydric alcohol, Since the crystalline polyester resin easily forms a crystal structure, a polycondensate using a linear aliphatic polymerizable monomer is more preferable than a polymerizable monomer having an aromatic ring.

Examples of the polyvalent carboxylic acid which is the polymerization component of the crystalline polyester resin include aliphatic dicarboxylic acids (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecandicarboxylic acid, 1,14-tetradecandicarboxyic acid, and 1,18-octadecanedicarboxylic acid), aromatic dicarboxylic acids (for example, dibasic acid such as phthalic acid, isophthalic acid, terephthalic acid, and naphthalene-2,6-dicarboxylic acid), anhydrides thereof, or lower (for example, 1 to 5 carbon atoms) alkyl esters thereof.

The polyvalent carboxylic acid may be used in combination with dicarboxylic acid and trivalent or higher carboxylic acid having a crosslinked structure or a branched structure. Examples of the trivalent carboxylic acid include aromatic carboxylic acids (for example, 1,2,3-benzenetricarboxylic acid, 1,2,4-benzenetricarboxylic acid, and 1,2,4-naphthalenetricarboxylic acid), anhydrides thereof, or lower (for example, 1 to 5 carbon atoms) alkyl esters thereof.

As the polyvalent carboxylic acid, a dicarboxylic acid having a sulfonic acid group and a dicarboxylic acid having an ethylenic double bond may be used in combination with these dicarboxylic acids.

These polyvalent carboxylic acids may be used alone, or two or more thereof may be used in combination.

—Release Agent—

Examples of the release agent include hydrocarbon waxes; natural waxes such as carnauba wax, rice wax, and candelilla wax; synthetic or mineral/petroleum waxes such as montan wax; and ester waxes such as fatty acid esters and montanic acid esters. The release agent is not limited to the examples.

The melting temperature of the release agent may be 50° C. or higher and 110° C. or lower, and preferably 60° C. or higher and 100° C. or lower.

The melting temperature of the release agent is obtained from a DSC curve obtained by differential scanning calorimetry (DSC), and specifically obtained in accordance with "melting peak temperature" described in the method of obtaining a melting temperature in JIS K 7121: 1987 "testing methods for transition temperatures of plastics".

—Coloring Agent—

Examples of the coloring agent includes various types of pigments such as carbon black, chrome yellow, Hansa yellow, benzidine yellow, threne yellow, quinoline yellow, pigment yellow, Permanent Orange GTR, Pyrazolone Orange, Vulcan Orange, Watch Young Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate, or various types of dyes such as acridine dye, xanthene dye, azo dye, benzoquinone dye, azine dye, anthraquinone dye, thioindigo dye, dioxazine dye, thiazine dye, azomethine dye, indigo dye, phthalocyanine dye, aniline black dye, polymethine dye, triphenylmethane dye, diphenylmethane dye, and thiazole dye. These coloring agents may be used alone, or two or more thereof may be used in combination.

As the coloring agent, if necessary, a surface-treated coloring agent may be used, or a dispersant may be used in combination.

A dispersion obtained by mixing plural kinds of particle dispersions is called a "mixed dispersion".

It is favorable to adjust a pH of the mixed dispersion to 3 or higher and 4 or lower after mixing the plural kinds of particle dispersions. Examples of a method of adjusting the pH of the mixed dispersion include adding an acidic aqueous solution of nitric acid, hydrochloric acid, or sulfuric acid.

A weight ratio of the particles contained in the mixed dispersion may be in the following range.

In a case where the mixed dispersion contains the release agent particles, the weight ratio between the binder resin particles and the release agent particles may be binder resin particles:release agent particles=100:1 to 100:40, preferably 100:5 to 100:30, and more preferably 100:10 to 100:20.

In a case where the mixed dispersion contains the coloring agent particles, the weight ratio between the binder resin particles and the coloring agent particles may be binder resin particles:coloring agent particles=100:1 to 100:200, preferably 100:5 to 100:60, and more preferably 100:10 to 100:30.

The aggregating step includes adding an aggregating agent to the mixed dispersion while stirring the mixed dispersion, and heating the mixed dispersion while stirring the mixed dispersion after adding the aggregating agent to the mixed dispersion to raise the temperature of the mixed dispersion.

Examples of the aggregating agent include a surfactant having an opposite polarity to the polarity of the surfactant contained in the mixed dispersion, an inorganic metal salt, a divalent or more metal complex. These aggregating agents may be used alone, or two or more thereof may be used in combination.

Examples of the inorganic metal salt include: metal salt such as calcium chloride, calcium nitrate, barium chloride, magnesium chloride, zinc chloride, aluminum chloride, and aluminum sulfate; an inorganic metal salt polymer such as poly aluminum chloride, poly aluminum hydroxide, and calcium polysulfide; and the like.

The aggregating agent may be a divalent or higher valent metal salt compound, and a trivalent metal salt compound is preferable, and a trivalent inorganic aluminum salt compound is more preferable. Examples of the trivalent inorganic aluminum salt compound include aluminum chloride, aluminum sulfate, polyaluminum chloride, and polyaluminum hydroxide.

The additive amount of the aggregating agent is not limited. In a case where the trivalent metal salt compound is used as the aggregating agent, the additive amount of the trivalent metal salt compound may be 0.1 parts by weight or more and 20 parts by weight or less, preferably 0.2 parts by weight or more and 10 parts by weight or less, and more preferably 0.5 parts by weight or more and 5 parts by weight or less, with respect to 100 parts by weight of the binder resin.

The aggregating step includes stirring the dispersion in the aggregating step at a required stirring power of 1.0 $kW/m^3$ or more and 6.0 $kW/m^3$ or less per unit volume. The required stirring power per unit volume may be 1.5 $kW/m^3$ or more and 5.5 $kW/m^3$ or less, and preferably 2.0 $kW/m^3$ or more and 5.0 $kW/m^3$ or less.

In the aggregating step, the viscosity of the dispersion during the stirring at the required stirring power of 1.0 $kW/m^3$ or more and 6.0 $kW/m^3$ or less per unit volume satisfies Requirement (1) and preferably further satisfies Requirement (2).

—Requirement (1)—

The viscosity of the dispersion during the stirring is 5 Pa·s or more and 50 Pa·s or less, preferably 10 Pa·s or more and 45 Pa·s or less, more preferably 15 Pa·s or more and 40 Pa·s or less, and still further preferably 20 Pa·s or more and 35 Pa·s or less at a shear rate of 1/s. Here, the viscosity of the dispersion is measured at a sample temperature of 25° C. using a part of the dispersion as a sample.

—Requirement (2)—

The viscosity of the dispersion during the stirring is preferably 0.1 Pa·s or more and 2.0 Pa·s or less, more preferably 0.3 Pa·s or more and 1.8 Pa·s or less, and still further preferably 0.5 Pa·s or more and 1.5 Pa·s or less at a shear rate of 20/s. Here, the viscosity of the dispersion is measured at a sample temperature of 25° C. using a part of the dispersion as a sample.

From the viewpoint of satisfying Requirements (1) and (2), a content of the surfactant contained in a mixed dispersion at a start of the aggregating step may be 1% or more and 10% or less, preferably 1.5% or more and 8% or less, and more preferably 2% or more and 5% or less, with respect to a total weight of the binder resin particles.

The content of the surfactant contained in the mixed dispersion is adjusted, for example, by adding the surfactant when preparing the mixed dispersion and increasing or decreasing the additive amount of the surfactant.

The temperature of the dispersion in the aggregating step may be 50° C. or lower, preferably 40° C. or higher and 50° C. or lower, and more preferably 43° C. or higher and 48° C. or lower, through the aggregating step, from the viewpoints that the particle size distribution of the aggregated particles becomes relatively narrow and the aggregated particles having large particle diameters are less likely to be mixed.

The aggregating step may be performed in a stirring tank provided with a jacket. The jacket is provided on an outer surface of the stirring tank and circulates water, steam, oil, and the like to control the temperature of contents in the stirring tank. As a form of the jacket, any known form may be applied.

The internal temperature of the jacket may be (glass transition temperature of the binder resin particles+5° C.) or lower through the aggregating step, from the viewpoint that the temperature of the dispersion in the stirring tank is prevented from being increased locally, and as a result, the aggregated particles having large particle diameters are less likely to be formed.

The internal temperature of the jacket may be 45° C. or higher, preferably 50° C. or higher, and more preferably 55° C. or higher.

In a case where plural kinds of binder resin particles having different glass transition temperatures are used as the binder resin particles, a weighted average of each glass transition temperature is used as the glass transition temperature in the aggregating step. The weighted average of each glass transition temperature refers to an average obtained by weighting the glass transition temperature of each kind of resin particles with a content ratio (weight basis) of each kind of resin particles.

The aggregating step may be performed in a stirring tank provided with a stirrer having a rotary shaft and a stirring blade attached to the rotary shaft. As a form of the stirring tank, any known form may be applied. The stirring blade may be any of a paddle blade, a propeller blade, a turbine blade, or an anchor blade.

A ratio L/d of a distance L between a liquid level in the stirring tank and an uppermost end of the stirring blade to a blade diameter d of the stirring blade may be 0.1 or more and 1.3 or less. In a case where the stirring tank is provided with plural stirring blades, the longest blade diameter among the blade diameters is defined as a blade diameter in the aggregating step. The liquid level in the stirring tank is a liquid level when the dispersion is allowed to stand at the start of the aggregating step.

When the ratio L/d is 0.1 or more, foaming on the liquid level in the stirring tank is prevented from occurring, and the aggregated particles having large particle diameters are less likely to be generated. From the viewpoint, the ratio L/d is preferably 0.3 or more, and more preferably 0.5 or more.

When the ratio L/d is 1.3 or less, the entirety including an upper part of the stirring tank is easily stirred, the particle size distribution of the aggregated particles becomes relatively narrow and the aggregated particles having large particle diameters are less likely to be mixed. From the viewpoint, the ratio L/d is more preferably 1.0 or less, and further preferably 0.8 or less.

The FIGURE illustrates an example of the stirring tank used in the aggregating step.

A stirring tank 10 shown in the FIGURE includes a baffle 20 and a paddle blade 40.

The baffle 20 has a plate shape or a columnar shape, and two, three, or four baffles are provided on an inner side surface of the stirring tank 10 at equal intervals.

The paddle blade 40 is provided on the rotary shaft 60 in two stages.

The distance L indicates a distance between a liquid level S in the stirring tank 10 and the uppermost end of the paddle blade 40.

The blade diameter d indicates a diameter of the paddle blade 40.

An inner diameter D of the stirring tank 10 and the blade diameter d of the paddle blade 40 may have a relationship of $0.35 \leq d/D \leq 0.65$.

The stirring tank 10 may be used in the second aggregating step and the coalescing step following the aggregating step.

A size of members in the drawing is conceptual, and the relative relationship between the sizes of the members is not limited thereto.

[Second Aggregating Step]

The second aggregating step is a step provided for the purpose of preparing a toner having a core-shell structure, and is a step provided after the first aggregating step. The second aggregating step is a step of forming a shell layer.

The second aggregating step is a step of further mixing a dispersion containing the aggregated particles and a dispersion containing resin particles to be a shell layer and aggregating the resin particles to be a shell layer on surfaces of the aggregated particles to form second aggregated particles.

The dispersion containing the resin particles to be the shell layer may be at least one selected from the binder resin particle dispersion for forming the core, and the polyester resin particle dispersion is preferable.

The second aggregating step includes, for example, adding a dispersion containing the resin particles to be the shell layer to a dispersion containing the aggregated particles while stirring the dispersion containing the aggregated particles, and heating the dispersion containing the aggregated particles after adding the dispersion containing the resin particles to be the shell layer while stirring the dispersion.

A reached temperature of the dispersion containing the aggregated particles reached when heating the dispersion containing the aggregated particles may be a temperature based on the glass transition temperature (Tg) of the resin particles to be the shell layer, for example, (Tg-30° C.) or higher of the resin particles to be the shell layer and (Tg-10° C.) or lower.

After the aggregated particles or the second aggregated particles are grown to a predetermined size and before heating of the coalescing step, a chelating agent relative to the aggregating agent used in the aggregating step may be added to the dispersion containing the aggregated particles and the second aggregated particles, for the purpose of stopping the growth of the aggregated particles and the second aggregated particles.

Examples of the chelating agent include: oxycarboxylic acid such as tartaric acid, citric acid, and gluconic acid; aminocarboxylic acid such as iminodiacetic acid (IDA), nitrilotriacetic acid (NTA), and ethylenediaminetetraacetic acid (EDTA), and the like.

The additive amount of the chelating agent may be, for example, 0.01 parts by weight or more and 5.0 parts by weight or less, and preferably 0.1 parts by weight or more and less than 3.0 parts by weight, with respect to 100 parts by weight of the binder resin particles.

After the aggregated particles or the second aggregated particles are grown to a predetermined size and before heating of the coalescing step, the of the dispersion containing the aggregated particles and the second aggregated particles may be raised, for the purpose of stopping the growth of the aggregated particles and the second aggregated particles.

Examples of a method of raising the pH of the dispersion containing the aggregated particles or the second aggregated particles include adding at least one selected from the group consisting of an aqueous solution of alkali metal hydroxide and aqueous solution of alkaline earth metal hydroxide.

A reached pH of the dispersion containing the aggregated particles or the second aggregated particles may be 8 or more and 10 or less.

[Coalescing Step]

The coalescing step is a step of coalescing the aggregated particles by heating a dispersion containing the aggregated particles to form toner particles.

In a case where the second aggregating step is provided before the coalescing step, the coalescing step is a step of coalescing the second aggregated particles by heating the dispersion containing the second aggregated particles to form toner particles. The toner particles having a core-shell structure may be prepared by going through the second aggregating step and the coalescing step.

The exemplary embodiment to be described below is common to the aggregated particles and the second aggregated particles.

The reached temperature of the dispersion containing the aggregated particles may be glass transition temperature (Tg) of the binder resin or higher, and specifically, preferably a temperature 10° C. to 30° C. higher than the Tg of the binder resin.

In a case where the aggregated particles contain plural kinds of binder resin having different Tg, the highest temperature of each Tg is used as the glass transition temperature in the coalescing step.

After completion of the coalescing step, a dried toner particles are obtained by subjecting the toner particles in the dispersion to known cleaning step, a solid-liquid separation step, and drying step. In the cleaning step, displacement cleaning using ion exchanged water may be sufficiently performed from the viewpoint of charging properties. For the solid-liquid separation step, suction filtration, pressure filtration, or the like may be performed from the viewpoint of productivity. For the drying step, freeze drying, airflow drying, fluidized drying, vibration-type fluidized drying, or the like may be performed from the viewpoint of productivity.

[Step of Externally Adding External Additive]

The preparing method of a toner according to the exemplary embodiment favorably includes a step of externally adding an external additive to the toner particles.

The external addition of the external additive to the toner particles is performed by mixing the dry toner particles and the external additive. The mixing may be performed with, for example, a V-blender, a Henschel mixer, a Lodige mixer, or the like. Furthermore, if necessary, coarse particles of the toner may be removed by using a vibration classifier, a wind classifier, or the like.

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, $MgSO_4$, and the like.

The surface of the inorganic particles as the external additive may be treated with a hydrophobizing agent. The hydrophobic treatment is performed, for example, by immersing the inorganic particles in a hydrophobizing agent. The hydrophobizing agent is not particularly limited, and examples thereof include a silane coupling agent, a silicone oil, a titanate coupling agent, and an aluminum coupling agent. These may be used alone, or two or more thereof may be used in combination.

The amount of the hydrophobizing agent is usually, for example, 1 part by weight or more and 10 parts by weight or less with respect to 100 parts by weight of the inorganic particles.

Examples of the external additive also include a resin particle (resin particles such as polystyrene, polymethylmethacrylate, and melamine resin), a cleaning aid (for example, a metal salt of higher fatty acid typified by zinc stearate, and a particle of fluorine-based high molecular weight body), and the like.

The external addition amount of the external additives may be 0.01% by weight or more and 5% by weight or less and preferably 0.01% by weight or more and 2.0% by weight or less, with respect to the weight of the toner particles.

<Toner>

The toner prepared by the preparing method according to the exemplary embodiment may be an external additive toner in which an external additive is externally added to the toner particles. The form of the external additive is as described above, The toner prepared by the preparing method according to the exemplary embodiment may be a toner having a single-layer structure, or may be a toner having a core-shell structure including a core portion (core) and a coating layer (shell layer) coating the core portion. The toner having the core-shell structure has: for example, a core portion containing a binder resin, a release agent, and a coloring agent; and a coating layer containing a binder resin.

The content of the binder resin may be 40% by weight or more and 95% by weight or less, preferably 50% by weight or more and 90% by weight or less, and more preferably 60% by weight or more and 85% by weight or less, with respect to the entire toner particles.

The content of the release agent may be 1% by weight or more and 20% by weight or less, and preferably 5% by weight or more and 15% by weight or less with respect to the entire toner.

When the toner contains the coloring agent, the content of the coloring agent may be 1% by weight or more and 30% by weight or less, and preferably 3% by weight or more and 15% by weight or less, with respect to the entire toner.

The volume average particle diameter of the toner particles may be 2 μm or more and 10 μm or less and preferably 4 μm or more and 8 μm or less. A measuring method of the volume average particle diameter of the toner is as follows.

The particle size distribution of the toner is measured using Coulter Multisizer Type II (manufactured by Beckman Coulter, Inc.) and using ISOTON-II (manufactured by Beckman Coulter, Inc.) as the electrolytic solution. In the measurement, a measurement sample of 0.5 mg or more and 50 mg or less is added to 2 ml of 5% by weight aqueous solution of a surfactant (preferably sodium alkylbenzene sulfonate) as a dispersant. This is added to the electrolytic solution of 100 ml to 150 ml. The electrolytic solution in which the sample is suspended is dispersed for 1 minute by an ultrasonic dispersion. Then, using the Coulter ultisizer II type, the particle size distribution of the particles having a particle diameter of 2 μm or more and 60 μm or less is measured using an aperture having an aperture diameter of 100 μm. The number of particles to be sampled is 50,000. The particle size distribution is drawn from the small diameter side, and a particle diameter at a cumulative total of 50% is defined as the volume average particle diameter D50v.

The average circularity of the toner may be 0.94 or more and 1.00 or less, and preferably 0.95 or more and 0.9 or less.

The average circularity of the toner is (Perimeter of a circle with the same area as a particle projection image)/(Perimeter of the particle projection image). The average circularity of the toner is determined by sampling 3,500 particles with a flow-type particle image analyzer (FPIA-3000 manufactured by SYSMEX CORPORATION).

<Developer>

The toner prepared by the preparing method according to the exemplary embodiment may be used as a single-component developer, or may be used as a two-component developer by mixing with a carrier.

The carrier is not particularly limited, and a well-known carrier may be used. Examples of the carrier include a coating carrier in which the surface of the core formed of magnetic particles is coated with the resin; a magnetic particle dispersion-type carrier in which the magnetic particles are dispersed and distributed in the matrix resin; and a resin impregnated-type carrier in which a resin is impregnated into the porous magnetic particles.

The magnetic particle dispersion-type carrier or the resin impregnated-type carrier may be a carrier in which the forming particle of the carrier is set as a core and the surface of the core is coated with the resin.

Examples of the magnetic particle include: a magnetic metal such as iron, nickel, and cobalt; a magnetic oxide such as ferrite, and magnetite; and the like.

Examples of the coating resin and the matrix resin include a straight silicone resin formed by containing polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, and an organosiloxane bond, or the modified products thereof, a fluororesin, polyester, polycarbonate, a phenol resin, and an epoxy resin. Other additives such as the conductive particles may be contained in the coating resin and the matrix resin. Examples of the conductive particles include metal such as gold, silver, and copper, carbon black, titanium oxide, zinc oxide, tin oxide, barium sulfate, aluminum borate, and potassium titanate.

Here, in order to coat the surface of the core with the resin, a method of coating the surface with a coating layer forming solution in which the coating resin and various additives (to be used if necessary) are dissolved in a proper solvent is used. The solvent is not particularly limited as long as a solvent is selected in consideration of a kind of a resin to be used and coating suitability.

Specific examples of the resin coating method include: a dipping method of dipping the core into the coating layer forming solution; a spray method of spraying the coating layer forming solution onto the surface of the core; a fluid-bed method of spraying the coating layer forming solution to the core in a state of being floated by the fluid air; a kneader coating method of mixing the core of the carrier with the coating layer forming solution and removing a solvent in the kneader coater; and the like.

The mixing ratio (weight ratio) of the toner to the carrier in the two-component developer may be in a range of toner:carrier=1:100 to 30:100, and is preferably in a range of 3:100 to 20:100.

EXAMPLES

Hereinafter, exemplary embodiments of the disclosure will be described in detail with reference to examples, but the exemplary embodiments of the disclosure are not limited to these examples.

In the following description, unless otherwise specified, "part(s)" and "%" are based on weight.

Unless otherwise specified, synthesis, treatment, preparation and the like are carried out at a room temperature (25° C.±3° C.).

<Preparation of Particle Dispersion>

[Preparation of Amorphous Polyester Resin Particle Dispersion (A1)]

Terephthalic acid: 690 parts
Fumaric acid: 310 parts
Ethylene glycol: 400 parts
1,5-Pentanediol: 450 parts The above materials are added to a reaction tank provided with a stirrer, a nitrogen introduction tube, a temperature sensor, and a rectification tower, the temperature is raised to 220° C. over 1 hour under a nitrogen gas stream, and 10 parts of titanium tetraethoxide is added to total 1,000 parts of the materials. The temperature is raised to 240° C. over 0.5 hours while distilling off the generated water, and the dehydration condensation reaction is continued at 240° C. for 1 hour, and then a reaction product is cooled. In this manner, an amorphous polyester resin (A) having a weight average molecular weight of 96,000 and a glass transition temperature of 59° C. is obtained.

550 parts of ethyl acetate and 250 parts of 2-butanol are added to a tank provided with a temperature controller and a nitrogen substitution unit to prepare a mixed solvent, and then 1,000 parts of the amorphous polyester resin (A) is slowly added and dissolved, and 10% aqueous ammonia solution (equivalent to 3 times the molar ratio of the acid value of the resin) is added thereto, and the mixture is stirred for 30 minutes. Next, an inside of the reaction vessel is replaced with dry nitrogen, the temperature is kept at 40° C., and 4,000 parts of ion exchanged water is added dropwise while stirring the mixture to emulsify. After completion of the dropping, the emulsion is returned to 25° C. and a solvent is removed under the reduced pressure to obtain a resin particle dispersion in which resin particles having a volume average particle diameter of 160 nm are dispersed. Ion exchanged water is added to the resin particle dispersion to adjust the solid content to 20% to obtain an amorphous polyester resin particle dispersion (A1).

[Preparation of Amorphous Polyester Resin Particle Dispersion (A2)]

700 parts of ethyl acetate and 500 parts of 2-butanol are added to a tank provided with a temperature controller and a nitrogen substitution unit to prepare a mixed solvent, and then 1,000 parts of the amorphous polyester resin (A) is slowly added and dissolved, and 10% aqueous ammonia solution (equivalent to 4 times the molar ratio of the acid value of the resin) is added thereto, and the mixture is stirred for 30 minutes. Next, an inside of the reaction vessel is replaced with dry nitrogen, the temperature is kept at 40° C. and 4,000 parts of ion exchanged water is added dropwise while stirring the mixture to emulsify. After completion of the dropping, the emulsion is returned to 25° C. and a solvent is removed under the reduced pressure to obtain a resin particle dispersion in which resin particles having a volume average particle diameter of 80 nm are dispersed. Ion exchanged water is added to the resin particle dispersion to adjust the solid content to 20% to obtain an amorphous polyester resin particle dispersion (A2).

[Preparation of Amorphous Polyester Resin Particle Dispersion (B1)]

Terephthalic acid: 690 parts
Trimellitic acid: 310 parts
Ethylene glycol: 400 parts
1,5-Pentanediol: 450 parts The above materials are added to a flask provided with a stirrer, a nitrogen introduction tube, a temperature sensor, and a rectification tower, the temperature is raised to 220° C. over 1 hour under a nitrogen gas stream, and 10 parts of titanium tetraethoxide is added to total 1,000 parts of the materials. The temperature is raised to 240° C. over 0.5 hours while distilling of the generated water, and the dehydration condensation reaction is continued at 240° C. for 1 hour, and then a reaction product is cooled. In this manner, an amorphous polyester resin (B) having a weight average molecular weight of 127,000 and a glass transition temperature of 59° C. is obtained.

700 parts of ethyl acetate and 500 parts of 2-butanol are added to a tank provided with a temperature controller and a nitrogen substitution unit to prepare a mixed solvent, and then 1,000 parts of the amorphous polyester resin (B) is slowly added and dissolved, and 10% aqueous ammonia solution (equivalent to 4 times the molar ratio of the acid value of the resin) is added thereto, and the mixture is stirred for 30 minutes. Next, an inside of the reaction vessel is replaced with dry nitrogen, the temperature is kept at 40° C. and 4,000 parts of ion exchanged water is added dropwise while stirring the mixture to emulsify. After completion of the dropping, the emulsion is returned to 25° C. and a solvent is removed under the reduced pressure to obtain a resin particle dispersion in which resin particles having a volume average particle diameter of 80 nm are dispersed. Ion exchanged water is added to the resin particle dispersion to adjust the solid content to 20% to obtain an amorphous polyester resin particle dispersion (B1).

[Preparation of Crystalline Polyester Resin Particle Dispersion (C1)]

1,10-Decanedicarboxylic acid: 2,600 parts
1,6-Hexanediol: 1,670 parts
Dibutyl tin oxide (catalyst): 3 parts The above materials are added to a heat-dried reaction tank, the air in the reaction tank is replaced with nitrogen gas to set an inert atmosphere, and the mixture is stirred and refluxed at 180° C. for 5 hours by mechanical stirring. Then, the temperature is slowly raised to 230° C. under the reduced pressure, the mixture is stirred for 2 hours, and when a viscous state is formed, air-cooling is performed and the reaction is stopped. In this manner, a crystalline polyester resin having a weight average molecular weight of 12,600 and a melting temperature of 73° C. is obtained.

900 parts of crystalline polyester resin, 18 parts of anionic surfactant (Tayca Power, manufactured by Tayca Corporation) and 2,100 parts of ion exchanged water are mixed, heated to 120° C., and dispersed using a homogenizer (Ultratarax T50 manufactured by IKA), and then a dispersion treatment is carried out with a pressure discharge type gaulin homogenizer for 1 hour to obtain a resin particle dispersion in which resin particles having a volume average particle diameter of 160 nm are dispersed. Ion exchanged water is added to the resin particle dispersion to adjust the solid content to 20% to obtain a crystalline polyester resin particle dispersion (C1).

[Preparation of Styrene Acrylic Resin Particle Dispersion (S1)]

Styrene: 3,750 parts
n-Butyl acrylate: 250 parts
Acrylic acid: 20 parts
Dodecane thiol: 240 parts
Carbon tetrabromide: 40 parts A surfactant aqueous solution in which 60 parts of a nonionic surfactant (manufactured by Sanyo Chemical Industries, Ltd., Nonipol 400) and 100 parts of an anionic surfactant (Tayca Power, manufactured by Tayca Corporation) are dissolved in 5,500 parts of ion exchanged water. A mixture obtained by mixing and dissolving the above polymerization materials is dispersed and emulsified in a surfactant aqueous solution. Next, an aqueous solution prepared in which 40 parts of ammonium persulfate is dissolved in 500 parts of ion exchanged water is added over 20 minutes while stirring the inside of the reaction tank. Then, after performing the nitrogen substitution, the inside of the reaction tank is heated with an oil bath until the content reaches 70° C. while stirring, and an emulsion polymerization is continued at 70° C. for 5 hours. In this manner, a resin particle dispersion in which the resin particles having a volume average particle diameter of 160 nm are dispersed is obtained. Ion exchanged water is added to the resin particle dispersion to adjust the solid content to 20% to obtain a styrene acrylic resin particle dispersion (S1).

[Preparation of Release Agent Particle Dispersion (W1)]

Paraffin wax (Nippon Seiro Co., Ltd., FNP92, melting temperature: 92° C.): 1,000 parts
Anionic surfactant (Tayca Power, manufactured by Tayca Corporation): 10 parts
Ion exchanged water: 3,500 parts The above materials are mixed, heated to 100° C., and dispersed using a homogenizer (Ultratarax T50 manufactured by IKA), and then dispersed with a pressure discharge type gaulin homogenizer to obtain a release agent particle dispersion in which release agent particles having a volume average particle diameter of 220 nm are dispersed. Ion exchanged water is added to the release agent particle dispersion to adjust the solid content to 20% to obtain a release agent particle dispersion (W1).

[Preparation of coloring agent particle dispersion (K1)]

Carbon black (manufactured by Cabot, Regal 330): 500 parts
Anionic surfactant (NEOGEN RK, Dai-Ichi Kogyo Seiyaku. Co., Ltd.): 50 parts
Ion exchanged water: 1,930 parts The above materials are mixed and dispersed at 240 MPa for 10 minutes by using an ultimaizer (manufactured by Sugino Machine Ltd.,) to obtain a coloring agent particle dispersion (K1) having a solid content concentration of 20%.

Example 1

[Preparation of Reaction Tank]

A stirring tank with a jacket and having paddle blades provided on the rotary shaft in two stages is prepared. The bottom of the stirring tank is connected to a disperser (Cavitron CD1010 manufactured by Pacific Machinery & Engineering Co., Ltd.) via a conduit and a circulation pump, and the conduit from a discharge port of the disperser is immersed in the tank from above the stirring tank to produce a circulation type reaction tank. An input port of materials is provided in the conduit connecting the bottom of the stirring tank and the disperser.

[First Aggregating Step]

Ion exchanged water: 5,000 parts

Amorphous polyester resin particle dispersion (A1): 2,630 parts

Amorphous polyester resin particle dispersion (B1): 2,630 parts

Crystalline polyester resin particle dispersion (C1): 1,500 parts

Styrene acrylic resin particle dispersion (S1): 750 parts

Release agent particle dispersion (W1): 1,500 parts

Coloring agent particle dispersion (K1): 1,500 parts

Anionic surfactant (manufactured by Kao Corporation, Neoperex G-15): 135 parts

The above materials are added to a circulation type reaction tank and stirred and mixed to obtain a mixed dispersion. A pH is adjusted to 3.8 by adding 0.1 N nitric acid to the mixed dispersion.

An aqueous aluminum sulfate solution in which 15 parts of aluminum sulfate is dissolved in 1,000 parts of ion exchanged water is prepared.

An aqueous aluminum sulfate solution is added from the input port while the content is stirred and dispersed by being circulated in the circulation type reaction tank. Then, the content is stirred and dispersed by being circulated for 10 minutes while maintaining the content at 30° C. Next, the disperser is stopped, a bottom valve at the bottom of the stirring tank is closed, and 1,500 parts of ion exchanged water is added from the input port and the mixture is added into the stirring tank through the disperser and the conduit.

Next, the stirring rotation speed of the paddle blade is set to 70 rpm, and the content is heated to 45° C. with a jacket and kept until the volume average particle diameter of the aggregated particles becomes 4.0 μm. In this case, the required stirring power per unit volume is 2.5 kW/m$^3$. Table 1 shows viscosities of the content during the stirring at a required stirring power of 2.5 kW/m$^3$ per unit volume.

[Second Aggregating Step]

The mixture of 2,250 parts of the amorphous polyester resin particle dispersion (A1) and 2,250 parts of the amorphous polyester resin particle dispersion (B1) is added to the stirring tank and kept for 30 minutes. Then, the pH is adjusted to 9.0 with a 1N aqueous sodium hydroxide solution.

[Coalescing Step]

The mixture is heated to 85° C. at a heating rate of 0.5° C./min while continuing stirring in the stirring tank, kept at 85° C. for 3 hours, and then cooled (first cooling) to 30° C. at 15° C./min., Next, the mixture is heated (re-heated) to 55° C. at a heating rate of 0.2° C./min, kept for 30 minutes, and then cooled (second cooling) to 30° C. at 0.5° C./min. Next, a solid content is filtered off, washed with ion exchanged water, and dried to obtain toner particles (K1) having a volume average particle diameter of 5.0 μm.

The volume proportion of the toner particles having a particle diameter of 2.00 times or more the volume average particle diameter of the toner particles is 0.2% by volume.

[Addition of External Additive]

100 parts of the toner particles (K1) and 1.5 parts of hydrophobic silica particles (RY50, manufactured by Nippon Aerosil Co., Ltd.) are mixed, and further mixed using a sample mill at a rotation speed of 10,000 rpm for 30 seconds. The toner (K1) is obtained by sieving with a vibrating sieve having a mesh size of 45 μm. A volume average particle diameter of the toner (K1) is 5.0 μm.

[Preparation of Carrier]

500 parts of spherical magnetite powder particles (volume average particle diameter: 0.55 μm) are stirred with a Henschel mixer, and then 5 parts of a titanate coupling agent is added thereto, heated to 100° C., and stirred for 30 minutes. Next, 6.25 parts of phenol, 9.25 parts of 35% formalin, 500 parts of magnetite particles treated with a titanate coupling agent, 6.25 parts of 25% ammonia aqueous solution, and 425 parts of water are added to a four-necked flask and stirred, and the mixture is reacted at 85° C. for 120 minutes while stirring. Then, the mixture is cooled to 25° C., 500 parts of water is added thereto, and then a supernatant is removed, and a precipitate is washed with water. The water-washed precipitate is heated under the reduced pressure and dried to obtain a carrier (CA) having an average particle diameter of 35 μm.

[Preparation of Developer]

The toner (K1) and the carrier (CA) are added to a V blender at a ratio of toner (K1):carrier (CA)=5:95 (weight ratio) and stirred for 20 minutes to obtain a developer (K1).

Examples 2 to 9, Comparative Examples 1 to 2

In the same manner as in Example 1, however, the preparing conditions of the toner particles are changed to the specifications shown in Table 1 to obtain toner particles. Then, as in Example 1, an external additive is added to the toner particles and mixed with a carrier to obtain a developer.

The "Surfactant (% by weight) with respect to binder resin" shown in Table 1 is prepared by increasing or decreasing the amount of the anionic surfactant used when preparing the mixed dispersion.

<Evaluation of Toner Performance>

[Dot-Shaped Color Unevenness Caused by Coarse Toner]

The developer is stored in a developing device of a modified machine of an image forming apparatus ApeosPort-IV C5575 manufactured by Fuji Xerox Co., Ltd. (a modified machine in which an automatic density control sensor is turned off in environmental changes). Using the image forming apparatus, 5,000 images having an image density of 1% are continuously printed on A4 paper in an environment of a temperature of 10° C. and a relative humidity of 15%. Subsequently, 1,000 images having an image density of 80% are continuously printed on A4 paper in an environment of a temperature of 30° C. and a relative humidity of 85%. The presence or absence of color spots is visually confirmed in 1,000 images printed with an image density of 80%, and the images are classified according to the following criteria.

G1: No color spots are generated.

G2: Color spots are generated on 1 or more and 5 or less sheets.

G3: Color spots are generated on 6 or more and 10 or less sheets.

G4: Color spots are generated on 11 or more sheets.

TABLE 1

| | Amorphous polyester resin particle dispersion | | Aggregating step | | | | |
|---|---|---|---|---|---|---|---|
| | First ※1 | Second ※2 | Aggregating agent | Surfactant with respect to binder resin | Temperature of jacket | Temperature of dispersion | Stirring rotation speed |
| | — | — | — | % by weight | ° C. | ° C. | rpm |
| Comparative Example 1 | A1 | B1 | Al sulfate | 1 | 60 | 45 | 70 |
| Example 2 | A1 | B1 | Al sulfate | 1.5 | 60 | 45 | 70 |
| Example 1 | A1 | B1 | Al sulfate | 2 | 60 | 45 | 70 |
| Example 3 | A1 | B1 | Al sulfate | 5 | 60 | 45 | 70 |
| Comparative Example 2 | A1 | B1 | Al sulfate | 10 | 60 | 45 | 70 |
| Example 4 | A1 | B1 | Al sulfate | 2 | 60 | 45 | 65 |
| Example 5 | A1 | B1 | Al sulfate | 2 | 60 | 45 | 90 |
| Example 6 | A1 | B1 | Al sulfate | 2 | 70 | 55 | 70 |
| Example 7 | A2 | B1 | Al sulfate | 2 | 60 | 45 | 70 |
| Example 8 | A1 | B1 | Ca chloride | 2 | 60 | 45 | 70 |
| Example 9 | A1 | B1 | Al sulfate | 2 | 60 | 45 | 70 |

| | Aggregating step | | | | Toner particles | | Performance |
|---|---|---|---|---|---|---|---|
| | Required stirring power per unit volume | Requirement (1) at shear rate of 1/s | Requirement (2) shear rate of 20/s | L/d | Volume average particle diameter | Proportion of coarse particles | evaluation Dot-shaped color unevenness |
| | kW/m$^3$ | Pa · s | Pa · s | — | μm | % by volume | — |
| Comparative Example 1 | 7.0 | 55 | 5.0 | 0.5 | 5.5 | 5.0 | G4 |
| Example 2 | 2.5 | 50 | 1.8 | 0.5 | 5.0 | 0.8 | G2 |
| Example 1 | 2.5 | 30 | 1.0 | 0.5 | 5.0 | 0.2 | G1 |
| Example 3 | 2.5 | 5 | 0.5 | 0.5 | 4.9 | 0.7 | G2 |
| Comparative Example 2 | 2.5 | 4 | 0.05 | 0.5 | 4.3 | 4.0 | G4 |
| Example 4 | 2.0 | 30 | 1.0 | 0.5 | 5.0 | 0.9 | G2 |
| Example 5 | 5.0 | 30 | 1.0 | 0.5 | 4.9 | 0.8 | G2 |
| Example 6 | 2.5 | 40 | 1.5 | 0.5 | 5.1 | 0.9 | G2 |
| Example 7 | 2.5 | 40 | 2.5 | 0.5 | 5.0 | 0.7 | G2 |
| Example 8 | 2.5 | 25 | 0.8 | 0.5 | 4.9 | 0.7 | G2 |
| Example 9 | 2.5 | 30 | 1.0 | 1.3 | 5.0 | 1.2 | G3 |

※1 Tg of polyester resin: 59° C.
※2 Tg of polyester resin: 59° C.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A preparing method of an electrostatic charge image developing toner, the method comprising:

aggregating binder resin particles in a dispersion containing the binder resin particles to form aggregated particles; and coalescing the aggregated particles by heating a dispersion containing the aggregated particles to form toner particles, wherein a content of a surfactant in the dispersion at a start of the aggregating step is 1 wt % or more and 10 wt % or less with respect to a total weight of the binder resin particles, the aggregating includes stirring the dispersion in the aggregating at a required stirring power of 1.0 kW/m$^3$ or more and 6.0 kW/m$^3$ or less per unit volume, the preparing method satisfies both the following Requirement (1) and the following Requirement 2:

Requirement (1): a viscosity of the dispersion during the stirring is 30 Pa·s or more and 50 Pa·s or less at a shear rate of 1/s, Requirement (2): the viscosity of the dispersion during the stirring is 0.5 Pa·s or more and 1.5 Pa·s or less at the shear rate of 20/s, where, for both the Requirement (1) and the Requirement (2), the viscosity of the dispersion is measured at a sample temperature of 25° C. using a part of the dispersion as a sample, the aggregating is performed in a stirring tank provided with a stirrer having a rotary shaft and a stirring blade attached to the rotary shaft, through the aggregating, a ratio L/d of a distance L between a liquid level in the stirring tank and an uppermost end of the stirring blade to a blade diameter d of the stirring blade is 0.3 or more and 1.0 or less, and through the aggregating the liquid level is above the stirring blade.

2. The preparing method of an electrostatic charge image developing toner according to claim 1, wherein through the aggregating, a temperature of the dispersion in the aggregating is 50° C. or lower.

3. The preparing method of an electrostatic charge image developing toner according to claim 1, wherein the aggregating is performed in a stirring tank provided with a jacket, and through the aggregating, an internal temperature of the jacket is (a glass transition temperature of the binder resin particles+5° C.) or lower.

4. The preparing method of an electrostatic charge image developing toner according to claim 2, wherein the aggregating is performed in a stirring tank provided with a jacket, and through the aggregating, an internal temperature of the jacket is (a glass transition temperature of the binder resin particles+5° C.) or lower.

5. The preparing method of an electrostatic charge image developing toner according to claim 1, wherein through the aggregating, the ratio L/d is 0.5 or more and 1.0 or less.

6. The preparing method of an electrostatic charge image developing toner according to claim 1, wherein through the aggregating, the ratio L/d is 0.5 or more and 0.8 or less.

7. The preparing method of an electrostatic charge image developing toner according to claim 1, wherein the aggregating includes adding an aggregating agent to the dispersion containing the binder resin particles, and the aggregating agent contains a trivalent metal salt compound.

8. The preparing method of an electrostatic charge image developing toner according to claim 1, wherein the dispersion containing the binder resin particles further contains release agent particles, and in the aggregating, the release agent particles are further aggregated to form the aggregated particles.

9. The preparing method of an electrostatic charge image developing toner according to claim 1, wherein the dispersion containing the binder resin particles further contains coloring agent particles, and in the aggregating, the coloring agent particles are further aggregated to form the aggregated particles.

10. The preparing method of an electrostatic charge image developing toner according to claim 1, further comprising:

after the aggregating, second aggregating of mixing the dispersion containing the aggregated particles and a dispersion containing resin particles to be a shell layer and aggregating the resin particles to be the shell layer on surfaces of the aggregated particles to form second aggregated particles, wherein in the coalescing, a dispersion containing the second aggregated particles is heated and the second aggregated particles are coalesced to form toner particles.

11. An electrostatic charge image developing toner which is prepared by the preparing method of an electrostatic charge image developing toner according to claim 1.

12. An electrostatic charge image developer comprising an electrostatic charge image developing toner which is prepared by the preparing method of an electrostatic charge image developing toner according to claim 1.

13. The preparing method of an electrostatic charge image developing toner according to claim 1, wherein the content of the surfactant in the dispersion at the start of the aggregating step is 1.5 wt % or more and 8 wt % or less with respect to the total weight of the binder resin particles.

14. The preparing method of an electrostatic charge image developing toner according to claim 1, wherein the aggregating is performed in a stirring tank provided with a stirrer having a rotary shaft, and paddle blades are provided on the rotary shaft in two stages.

15. A preparing method of an electrostatic charge image developing toner, the method comprising:

aggregating binder resin particles in a dispersion containing the binder resin particles to form aggregated particles; and coalescing the aggregated particles by heating a dispersion containing the aggregated particles to form toner particles, wherein a content of a surfactant in the dispersion at a start of the aggregating step is 1 wt % or more and 10 wt % or less with respect to a total weight of the binder resin particles, the aggregating includes stirring the dispersion in the aggregating at a required stirring power of 1.0 $kW/m^3$ or more and 6.0 $kW/m^3$ or less per unit volume, the preparing method satisfies both the following Requirement (1) and the following Requirement 2:

Requirement (1): a viscosity of the dispersion during the stirring is 5 Pa·s or more and 50 Pa·s or less at a shear rate of 1/s, Requirement (2): the viscosity of the dispersion during the stirring is 0.1 Pa·s or more and 2.0 Pa·s or less at the shear rate of 20/s, where, for both the Requirement (1) and the Requirement (2), the viscosity of the dispersion is measured at a sample temperature of 25° C. using a part of the dispersion as a sample, the aggregating is performed in a stirring tank provided with a stirrer having a rotary shaft and a stirring blade attached to the rotary shaft, through the aggregating, a ratio L/d of a distance L between a liquid level in the stirring tank and an uppermost end of the stirring blade to a blade diameter d of the stirring blade is 0.3 or more and 1.0 or less, and through the aggregating the liquid level is above the stirring blade.

* * * * *